Patented Apr. 2, 1940

2,196,004

UNITED STATES PATENT OFFICE 2,196,004

RECOVERY OF SULPHUR DIOXIDE

Raymond F. Bacon, Bronxville, and Rocco Fanelli, New Rochelle, N. Y.; said Fanelli assignor to said Bacon No Drawing. Application January 21, 1938, Serial No. 186,152

9 Claims. (Cl. 23—178)

This invention relates to the recovery of sulphur dioxide and has for an object the provision of an improved process for recovering sulphur dioxide from gases containing sulphur dioxide mixed with other gases. The process of the invention may be employed for the recovery of sulphur dioxide from gas mixtures containing sulphur dioxide in any degree of concentration, and it is particularly suitable for the treatment of gas mixtures containing relatively small concentrations of sulphur dioxide such, for example, as gas mixtures resulting from the roasting of pyrites and other sulphide ores, concentrates and other metallurgical raw materials and products containing metal sulphides.

The process of the invention may be employed to produce a substantially pure sulphur dioxide product, in either gaseous or liquid form, or to produce gaseous products containing sulphur dioxide in any suitable proportions. The invention provides an effective and economical method for producing sulphur dioxide-bearing reagents for various chemical and metallurgical uses, as for example, in the production of sulphuric acid, in the production of sulphite cooking liquors, in the production of elemental sulphur by reduction of the sulphur dioxide, in refrigeration and in the leaching of ores. The invention further provides an effective and economical method of reducing or eliminating the injurious effects resulting from discharging roaster and other smelter gases into the atmosphere, and, at the same time, permits the recovery in useful form of an important component of such injurious gases.

The process of the invention is of the type in which gases containing sulphur dioxide are treated with a liquid solvent or absorbent, and the absorbed sulphur dioxide is expelled by heating, the regenerated solvent or absorbent being used for the treatment of additional quantities of gases.

We have discovered that borates may be employed effectively for the absorption of sulphur dioxide from mixtures of gases containing sulphur dioxide. We have discovered, also, that boric acids may be employed advantageously in absorption mixtures containing borates and in absorption mixtures containing absorption agents other than borates to aid in the liberation of the absorbed sulphur dioxide during a subsequent heating operation and without materially decreasing the efficiency of the absorption operation. We have discovered further that borates may be employed advantageously in conjunction with weak acids other than boric acids in the absorption and recovery of sulphur dioxide. In one of its broad aspects, the invention contemplates the use for the recovery of sulphur dioxide of any borate capable of reacting with sulphur dioxide or with sulphurous acid to form a compound from which sulphur dioxide may be liberated or expelled by heating. In a second broad aspect, the invention contemplates the use of a boric acid in conjunction with an absorption agent other than a borate to aid in the liberation of the absorbed sulphur dioxide by heating, and, vice versa, a weak acid other than a boric acid in conjunction with a borate, as the chemical systems usually would be the same in both cases. In another broad aspect, the invention contemplates the use of borates in conjunction with boric acids for the absorption and liberation of sulphur dioxide. In one of its more limited aspects, the invention contemplates the use of borates of alkali metals, alkaline earth metals, ammonium and magnesium for the recovery of the sulphur dioxide by absorption.

Because of their availability and relative cheapness, we prefer to employ tetraborates of sodium, potassium, ammonium and metaborate of magnesium for the absorption of sulphur dioxide and to employ ortho boric acid ($H_3BO_3$) for aiding in the liberation of absorbed sulphur dioxide, but any suitable borate may be employed for absorption and any suitable boric acid may be employed for the liberation of the sulphur dioxide.

Borates employed for absorption may be dissolved or suspended in any suitable liquid media.

The borate may be only slightly soluble in the liquid medium employed or the liquid medium employed may be a solvent for the borate. When a solvent for the borate is employed as the liquid medium, the borate may be employed in an amount sufficient to partially or completely saturate the liquid or the borate may be employed in an amount in excess of that required to saturate the liquid. The liquid medium employed should be one in which the boric acid employed is soluble to some extent. Preferably, water is the liquid medium employed. The amount of borate dissolved or suspended or both dissolved and suspended in the liquid medium will depend upon the results sought to be accomplished. Generally, the larger the amount of borate employed relatively to or in proportion to the volume of liquid medium employed, as, for example, in the case of water, the greater will be the absorption capacity of the solution or mixture. For economic reasons, it is preferable to employ an absorption solution or mixture containing a borate or containing an absorption agent other than a borate, of the highest absorption capacity consistent with the proper operation of the process and the proper functioning of the apparatus employed.

The boric acid may be employed in any amount which will accelerate the liberation of sulphur dioxide. We have employed effectively amounts of boric acid equal to about 25, 50, 75 and 100 percent of the amount required to saturate the absorption solution at its boiling temperature at the conclusion of the stripping operation. We have found that the rate of liberation of sulphur dioxide is roughly proportional to the amount of boric acid present up to the point of saturation of the absorption solution at the boiling temperature of the solution, the sulphur dioxide being liberated more effectively and more completely in a given short period of time when the absorption solution is substantially saturated at the boiling temperature with the boric acid employed.

It is to be understood that, in referring to the presence of boric acid in the absorption solution during the absorption operation or during the liberating or stripping operation, we mean free boric acid in an amount in excess of the amount which may be liberated by reaction of the sulphur dioxide with a borate employed as the absorption agent or otherwise produced as a product of the particular chemical environment. Results tabulated below show that unless free boric acid, as defined above, is present in substantial quantity, the recovery of sulphur dioxide in the liberation or stripping stage of the process is very low. When a borate is employed, a boric acid is liberated through reaction of the sulphur dioxide with the borate and possibly by hydrolysis and dissociation. The boric acid which we employ is not to be confused with acid resulting naturally from solution of a borate employed for absorption or resulting from reaction of sulphur dioxide with a borate in solution. It is to be understood further that this discussion is concerned with amount and not with kind of boric acid. The boric acid which we employ may be the same as or different than the boric acid produced from the sources and under the conditions indicated above. Obviously, the same effective chemical system may be built up by starting with a borate and adding a weak acid which is more soluble than boric acid at lower temperatures. Thus, the systems, sodium borate plus citric acid and sodium citrate plus boric acid are the same.

The absorption operation, employing a borate, may be carried out at any suitable temperature. At temperatures of 20° C., 45° C., 50° C., 55° C., 60° C. and 70° C. and in the presence of excess boric acid sufficient to saturate the absorption solutions at their boiling temperatures, we have absorbed amounts of sulphur dioxide substantially equal to the theoretical capacities of the borate solutions employed; and at a temperature of 80° C., but with other conditions the same, we have absorbed amounts of sulphur dioxide equal to about 70 percent of the theoretical capacities of the borate solutions employed. When boric acid is employed in conjunction with an absorption agent other than a borate, the temperature of absorption may be the same as that at which absorption would be carried out with such an agent in the absence of boric acid, but preferably below 80° C. Our researches have indicated that the tendency of boric acid to reverse the absorption reaction is not pronounced at temperatures below 80° C. This is a very great advantage of our absorption systems as compared with other proposed absorption systems where the temperature differences for good absorption and good liberation of sulphur dioxide are very great as compared with those differences permissible in employing our systems to achieve equivalent results.

For the liberation of sulphur dioxide, the solution may be heated to any suitable temperature at which the boric acid causes effective reversal of the absorption reaction. We may liberate the sulphur dioxide very rapidly and completely by heating the solutions to their boiling points.

In carrying out a process in accordance with our invention, we may absorb sulphur dioxide at any temperature or temperatures between the freezing points of the solutions and about 75° C., and we may liberate the absorbed sulphur dioxide by heating the solutions to a temperature or to temperatures of about 85° C. up to the boiling points of the solutions at atmospheric or subatmospheric pressure. For reasons of economy, in carrying out a process of the invention, the sulphur dioxide usually will be absorbed at about 70 to 75° C. and driven off or liberated at as low a temperature as possible above 85° C.

When the amount of boric acid employed is in excess of the amount which is soluble in the absorption solution at the absorption temperature, the excess boric acid may be separated from the absorption solution, after cooling following the liberation step, or the cooled solution may be employed for absorption while in contact with the excess boric acid. If the cooled solution and the excess boric acid are separated, they are mixed again prior to subjecting the solution to the liberation operation. It is characteristic of this absorption solution or mixture that the excess boric acid does not interfere with the absorption of the sulphur dioxide. Just as much sulphur dioxide can be absorbed in the presence of the boric acid as can be absorbed in the absence of boric acid.

For purposes of illustration, the invention will be described hereinafter more particularly with respect to processes involving the use of borax (sodium tetraborate, $Na_2B_4O_7 \cdot 10H_2O$) as the absorption agent and ortho boric acid (boracic acid, $H_3BO_3$) as the acid aiding in liberating the absorbed sulphur dioxide. The following data show results obtained in employing such compounds in the amounts and at the temperatures indicated with water as the liquid medium:

| Concentration of borax solution in moles per liter | Excess boric acid in grams per liter | Grams SO₂ absorbed per liter of liquid phase | Temp. of absorption, °C. | Temp. of liberation, °C. | Time of liberation in minutes | Percent SO₂ liberated and recovered |
|---|---|---|---|---|---|---|
| 0.15 | None | 23.7 | 20 | 100–104 | 5 | 21.0 |
|  |  |  |  |  | 15 | 32.5 |
| 0.15 | 80 | 23.8 | 20 | 100–104 | 5 | 39.0 |
|  |  |  |  |  | 15 | 55.0 |
| 0.15 | 160 | 23.0 | 20 | 100–104 | 5 | 44.5 |
|  |  |  |  |  | 15 | 71.0 |
| 0.15 | 240 | 23.8 | 20 | 100–104 | 5 | 71.5 |
|  |  |  |  |  | 15 | 93.3 |
| 0.15 | 320 | 24.3 | 20 | 100–104 | 5 | 87.0 |
|  |  |  |  |  | 10 | 96.0 |
| 0.15 | 400 | 25.0 | 20 | 100–104 | 5 | 93.5 |
|  |  |  |  |  | 10 | 97.0 |
| 0.15 | 480 | 23.9 | 20 | 100–104 | 5 | 93.7 |
|  |  |  |  |  | 10 | 99.2 |
| 0.5 | None | 66.6 | 45 | 100–103 | 5 | 9.6 |
|  |  |  |  |  | 10 | 16.4 |
| 0.5 | 400 | 72.3 | 45 | 100–103 | 5 | 79.0 |
|  |  |  |  |  | 10 | 88.0 |
| 0.5 | 480 | 71.7 | 45 | 100–104 | 5 | 88.0 |
| 0.5 | 560 | 70.4 | 45 | 100–104 | 5 | 89.0 |
|  |  |  |  |  | 10 | 95.0 |
| 0.85 | 640 | 124.2 | 50 | 100–105 | 5 | 89.3 |
|  |  |  |  |  | 10 | 96.3 |
| 0.85 | 640 | 123.0 | 70 | 100–105 | 5 | 92.5 |
| 0.85 | 640 | 90.2 | 80 |  |  |  |
| 0.85 | 640 | 74.2 | 80 |  |  |  |
| 0.9 | None | 122.4 | 50 | 100–103 | 5 | 15.8 |
| 0.9 | 400 | 129.3 | 50 | 100–104 | 5 | 72.6 |
|  |  |  |  |  | 10 | 79.5 |
| 0.9 | 480 | 131.8 | 50 | 100–103 | 5 | 78.6 |
| 0.9 | 560 | 137.6 | 50 | 100–104 | 5 | 84.0 |
|  |  |  |  |  | 10 | 90.4 |
| 0.9 | 640 | 116.4 | 55 | 100–104 | 5 | 78.7 |
|  |  |  |  |  | 10 | 92.2 |
| 1.0 | 640 | 126.3 | 70 | 100–104 | 5 | 87.6 |
| 1.0 | 640 | 123.7 | 70 | 100–106 | 5 | 92.0 |
| 1.0 | 400 | 129.3 | 60 |  |  |  |
| 1.3 | None | 154.4 | 70 |  |  |  |
| 1.3 | 400 | 139.0 | 75 |  |  |  |
| 1.3 | 680 | 153.3 | 70 | 100–106 | 5 | 90.0 |
| 1.3 | 800 | 175.2 | 60 | 100–106 | 5 | 94.0 |
| 1.3 | 800 | 171.8 | 70 | 100–106 | 5 | 92.0 |
| 1.3 | None | 169.8 | 70 | 100–105 | 5 | 26.7 |
| 1.3 | 400 | 161.3 | 70 | 100–106 | 5 | 76.0 |
| 1.3 | 600 | 162.6 | 70 | 100–107 | 5 | 90.0 |

The above results were obtained in the treatment of gases of the nature of roaster gases containing about 6 to 7 percent of sulphur dioxide. The gases in each case were bubbled rapidly through a pool of the absorption solution about 3 to 4 inches in depth at atmospheric pressure. The absorption of sulphur dioxide by the solutions was very rapid and complete. Liberation of the sulphur dioxide was accomplished by heating the solutions to the temperatures indicated at atmospheric pressure.

Results obtained in using potassium tetraborate are comparable to those shown above.

Ammonium borate can be employed advantageously, also, as indicated by the following data showing results obtained in using a fifteen-hundredths (0.15) molar solution of ammonium tetraborate under conditions similar to those employed in obtaining the results set forth above for sodium tetraborate:

| Excess boric acid in grams per liter | Grams SO₂ absorbed per liter of liquid phase | Temp. of absorption, °C. | Temp. of liberation, °C. | Time of liberation in minutes | Percent SO₂ liberated and recovered |
|---|---|---|---|---|---|
| None | 23.7 | 20 | 100–104 | 5 | 22.2 |
|  |  |  |  | 10 | 31.0 |
| 160 | 25.0 | 20 | 100–104 | 5 | 43.6 |
|  |  |  |  | 10 | 60.5 |
| 240 | 24.3 | 20 | 100–104 | 5 | 68.0 |
|  |  |  |  | 10 | 78.5 |
| 320 | 23.9 | 20 | 100–104 | 5 | 70.7 |
|  |  |  |  | 10 | 85.5 |
| 400 | 25.9 | 20 | 100–104 | 5 | 84.5 |
|  |  |  |  | 10 | 91.5 |
| 320 | 24.7 | 20 | 100–104 | 5 | 86.0 |
|  |  |  |  | 10 | 94.5 |
| 480 | 26.6 | 20 | 100–104 | 5 | 81.0 |

Tests involving the use of magnesium borate and calcium borate with boracic acid for absorption of sulphur dioxide gave results of the following type, mixtures of magnesium borate or calcium borate, boracic acid and water in the proportions indicated being subjected to the action of gas containing six percent of sulphur dioxide by volume until completely saturated with sulphur dioxide and the resulting saturated mixtures being heated to their boiling points (about 115° C.) to liberate the absorbed sulphur dioxide:

| Magnesium borate, parts by weight | Excess boric acid, parts by weight | Water, parts by weight | Percent SO₂ liberated by heating mixture to boiling point |
|---|---|---|---|
| 5 | None | 9 | 27 |
| 5 | 3 | 9 | 69 |
| 5 | 6 | 9 | 91 |
| 5 | 10 | 13 | 92 |

| Calcium borate, parts by weight | Excess boric acid, parts by weight | Water, parts by weight | Percent SO₂ liberated by heating mixture to boiling point |
|---|---|---|---|
| 2.5 | None | 6 | 2 |
| 2.5 | 2.0 | 8 | 5 |
| 2.5 | 5.0 | 10 | 17 |
| 2.5 | 8.0 | 12 | 18 |

The following data illustrate the necessity of employing a large excess of boric acid to reverse the absorption reaction and liberate sulphur dioxide when calcium and magnesium borates are employed for absorption. These data were obtained by heating mixtures containing magnesium sulphite or calcium sulphite, boric acid and water, in the proportions indicated, to their boiling points (about 115° C.):

| Magnesium sulphite MgSO₃.6H₂O, parts by weight | Excess boric acid, parts by weight | Water, parts by weight | Percent SO₂ liberated by heating the mixture to its boiling point |
|---|---|---|---|
| 5 | None | 11.0 | 0.5 |
| 5 | 7.50 | 11.0 | 63.0 |
| 5 | 10.00 | 11.0 | 78.0 |
| 5 | 12.50 | 11.5 | 98.0 |
| 5 | 12.00 | 25.0 | 99.8 |
| 5 | 12.50 | 5.0 | 99.0 |
| 5 | 10.00 | 16.0 | 83.0 |
| 5 | 5.00 | 16.0 | 35.0 |
| 5 | 3.00 | 16.0 | 8.0 |
| 5 | 5.00 | 5.0 | 35.0 |
| 5 | 12.50 | 5.0 | 98.0 |
| 5 | 2.25 | 8.0 | 16.0 |

| Calcium sulphite CaSO₃.2H₂O, parts by weight | Excess boric acid, parts by weight | Water, parts by weight | Percent SO₂ liberated by heating the mixture to its boiling point |
|---|---|---|---|
| 5 | None | 11.0 | None |
| 5 | 9.0 | 11.0 | 32 |
| 5 | 12.5 | 11.0 | 18 |
| 5 | 17.5 | 11.5 | 38 |
| 5 | 17.5 | 16.0 | 73 |
| 5 | 20.0 | 16.0 | 62 |
| 5 | 25.0 | 20.5 | 58 |

The above results relating to the use of compounds of calcium and magnesium indicate that magnesium borate may be used more effectively than calcium borate in sulphur dioxide recovery operations. Calcium sulphite, a reaction product obtained in the use of calcium borate for sulphur dioxide absorption, shows considerable resistance to decomposition by boric acid.

In employing borates and boric acid, we prefer to employ, at the temperature of the absorption operation, a two phase absorption medium comprising as a liquid phase water saturated with respect to both compounds and containing as a solid phase an excess of one or both compounds in the solid state. In employing these and other compounds, we may conduct either the absorption operation or the liberation operation or both operations at pressures above or below atmospheric pressure, but we find that both operations go well at prevailing atmospheric pressures.

In carrying out a process in accordance with the invention, we may so control the time of contact of gases and absorption solution as to accomplish absorption of any desired percentage of the sulphur dioxide contained in the gases; we may so control the duration of the absorption operation as to achieve any desired degree of saturation of the absorption solution with sulphur dioxide; and we may so control the liberation operation as to achieve liberation of any desired percentage of sulphur dioxide absorbed in any absorption cycle. It usually is more economical from the standpoint of both operating and apparatus cost to absorb and liberate the greatest amount possible per unit volume of solution or absorption mixture and our solutions or mixtures are particularly advantageous in this respect, that very large amounts of sulphur dioxide per unit volume can be handled or transferred in one cycle.

As absorption proceeds, the sulphur dioxide and the borate react to liberate boric acid with the production of a sulphite, bisulphite or mixture of sulphite and bisulphite of the metal of the borate, depending upon the degree of absorption as determined by the quantity of sulphur dioxide contacted with the absorption solution or mixture. Sulphite forms first, and, when sufficient sulphur dioxide to form sulphite with all of the metal of the borate has been absorbed, the absorption of additional sulphur dioxide results in the production of bisulphite by reaction with the sulphite. Thus, for example, when sodium tetraborate (borax) is employed in an aqueous medium, sodium sulphite, sodium bisulphite or a mixture of sodium sulphite and sodium bisulphite may be produced, sodium sulphite being formed first by reaction of sulphurous acid formed by the water present and the sulphur dioxide and sodium bisulphite being formed by reaction of sulphurous acid with the sodium sulphite. The excess boric acid employed functions to reverse the reaction with respect to both the sulphite and bisulphite, bisulphite being first converted to sulphite. In practicing the invention, we may employ a sulphite for absorption with the production of a bisulphite by absorption, and, in the liberation step, with excess or free boric acid, we may liberate all or only a portion of the combined sulphur dioxide which forms bisulphite with the sulphite and thus regenerate sulphite or we may liberate, in addition, any desired amount of the combined sulphur dioxide which forms sulphite, depending on the amount of free boric acid which is present.

In carrying out a process of the invention, the sulphur dioxide-bearing gases may be treated with the absorption solution in any manner known to the art of contacting gases and liquids. Thus, for example, the gases may be passed over the surface of a body of solution, with continuous or intermittent agitation of the solution, the gases may be bubbled through one or more bodies or pools of the solution, or the gases and the solution may be passed, either co-currently or counter-currently, through a packed or baffle tower in contact with one another.

If gases such as roaster gases are being treated, they are preferably cooled to the extent necessary or desirable and treated for the removal of dust and other objectionable impurities contained therein prior to treatment with the absorption solution. The degree of cooling of the gases may often be less than with other absorption solutions or agents because of the higher absorption temperatures permissible in using our solutions or mixtures.

The apparatus employed in carrying out a process of the invention should be so arranged that available heat may be utilized efficiently. Thus, for example, when hot roaster gases are being treated, the heat contained in the gases may be utilized for heating the sulphite solution from which sulphur dioxide is to be liberated, and the sulphite solution produced in the absorption operation may be heated by the regenerated absorption solution to avoid wasting the heat contained therein.

Heating of the sulphite solution for the purpose of liberating sulphur dioxide may be carried out in any suitable manner. For example, the solution may be heated in a closed receptacle out of contact with other gases, or the solution may be heated by contact with a body or stream of another gas to which it is desired to transfer the sulphur dioxide, or it may be heated by live steam injected into it. In commercial operation, the concentration or volume of the solution should be kept reasonably constant, which requires the addition of water in some form or manner to make up for the water carried away by the gases in the absorption stage. Live steam can be employed in the liberation or stripping stage to perform this additional function in whole or in part.

The gaseous product formed by heating the absorption solution in a closed receptacle out of contact with other gases is substantially pure sulphur dioxide and it may be utilized for a suitable industrial purpose directly (diluted or undiluted) or it may be cooled to a suitable temperature and compressed to form liquid sulphur dioxide.

We claim:

1. In a process for recovering sulphur dioxide from gases containing the same involving the use of an absorption liquid containing a compound capable of reacting with sulphur dioxide to form a salt of sulphurous acid and heating of the absorption liquid to liberate sulphur dioxide absorbed therein, the improvement which comprises liberating absorbed sulphur dioxide by heating the absorption liquid in the presence of boric acid in amount substantially sufficient to saturate the absorption liquid with respect thereto at the temperature of liberation of the sulphur dioxide.

2. In a process for recovering sulphur dioxide from gases containing the same involving the use of an aqueous medium containing a salt of a weak acid to absorb sulphur dioxide and heating of the resulting aqueous product to liberate absorbed sulphur dioxide, the improvement which comprises heating the aqueous product of the absorption treatment in the presence of boric acid in amount substantially sufficient to saturate the aqueous medium with respect thereto at the temperature of liberation of the sulphur dioxide.

3. The process for recovering sulphur dioxide from gases containing the same which comprises treating the gases with an aqueous absorption liquid containing a borate and excess boric acid to absorb sulphur dioxide, heating the absorption liquid to liberate sulphur dioxide absorbed therein, and collecting the liberated sulphur dioxide, excess boric acid being employed in an amount substantially sufficient to saturate the absorption liquid with respect to boric acid at the temperature of liberation of the sulphur dioxide.

4. The process for recovering sulphur dioxide from gases containing the same which comprises treating the gases with an aqueous absorption liquid containing a borate and excess boric acid to absorb sulphur dioxide, heating the absorption liquid to liberate sulphur dioxide absorbed therein, and collecting the liberated sulphur dioxide, borate being employed in an amount substantially sufficient to saturate the absorption liquid with respect thereto at the temperature of absorption of the sulphur dioxide and excess boric acid being employed in an amount substantially sufficient to saturate the absorption liquid with respect to boric acid at the temperature of liberation of the sulphur dioxide.

5. The process for recovering sulphur dioxide from gases containing the same which comprises treating the gases with an aqueous absorption liquid containing a borate and excess boric acid to absorb sulprur dioxide, heating the absorption liquid to liberate sulphur dioxide absorbed therein, and collecting the liberated sulphur dioxide, borate being employed in an amount in excess of that required to saturate the absorption liquid with respect thereto at the temperature of absorption of the sulphur dioxide and excess boric acid being employed in an amount in excess of that required to saturate the absorption liquid with respect to boric acid at the temperature of liberation of the sulphur dioxide.

6. The process for recovering sulphur dioxide from gases containing the same which comprises treating the gases with a borate contained in an aqueous medium to absorb sulphur dioxide, heating the resulting aqueous product in contact with excess boric acid to liberate sulphur dioxide, and collecting the liberated sulphur dioxide, the amount of excess boric acid employed being at least sufficient to saturate the aqueous product with respect thereto at the temperature of liberation of the sulphur dioxide.

7. The process for recovering sulphur dioxide from gases containing the same which comprises treating the gases with ammonium borate contained in an aqueous absorption liquid to absorb sulphur dioxide contained in the gases, heating the absorption liquid in the presence of excess boric acid to liberate sulphur dioxide contained therein, and collecting the liberated sulphur dioxide, excess boric acid being employed in an amount substantially sufficient to saturate the absorption liquid with respect to boric acid at the temperature of liberation of the sulphur dioxide.

8. The process for recovering sulphur dioxide from gases containing the same which comprises treating the gases with magnesium borate contained in an aqueous absorption liquid to absorb sulphur dioxide contained in the gases, heating the absorption liquid in the presence of excess boric acid to liberate sulphur dioxide contained therein, and collecting the liberated sulphur dioxide, excess boric acid being employed in an amount substantially sufficient to saturate the absorption liquid with respect to boric acid at the temperature of liberation of the sulphur dioxide.

9. The process for recovering sulphur dioxide from gases containing the same which comprises treating the gases with calcium borate contained in an aqueous absorption liquid to absorb sulphur dioxide contained in the gases, heating the absorption liquid in the presence of excess boric acid to liberate sulphur dioxide contained therein, and collecting the liberated sulphur dioxide, excess boric acid being employed in an amount substantially sufficient to saturate the absorption liquid with respect to boric acid at the temperature of liberation of the sulphur dioxide.

RAYMOND F. BACON.
ROCCO FANELLI.